Oct. 20, 1964 J. F. LAWRENCE ETAL 3,153,344
SAMPLING PROBE
Filed July 5, 1962 2 Sheets-Sheet 2

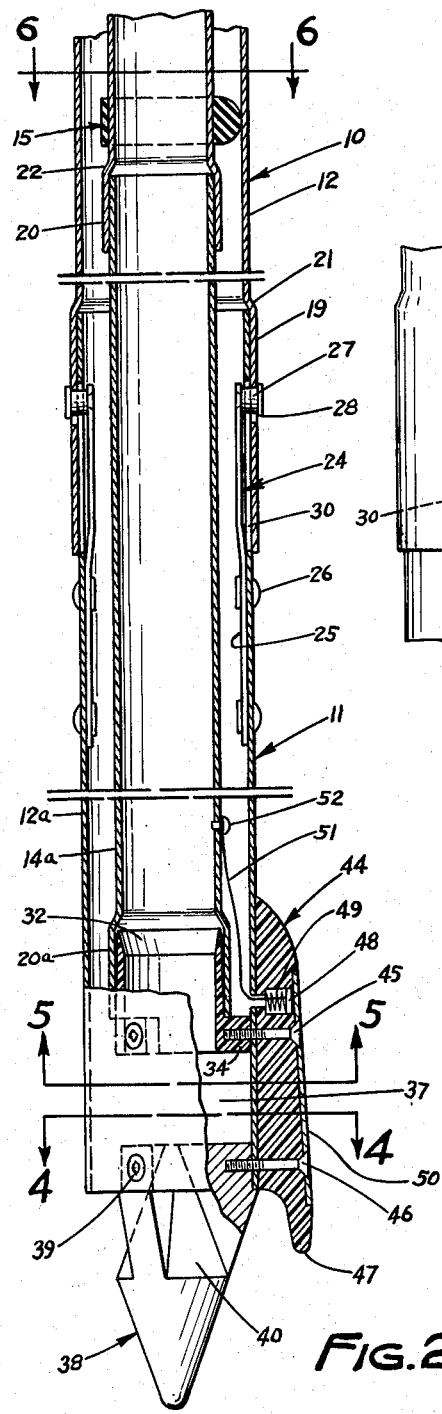
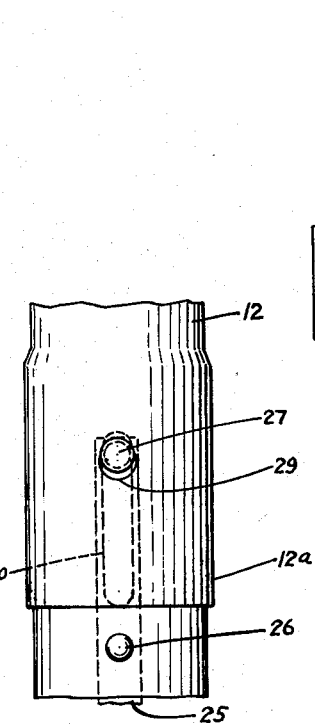
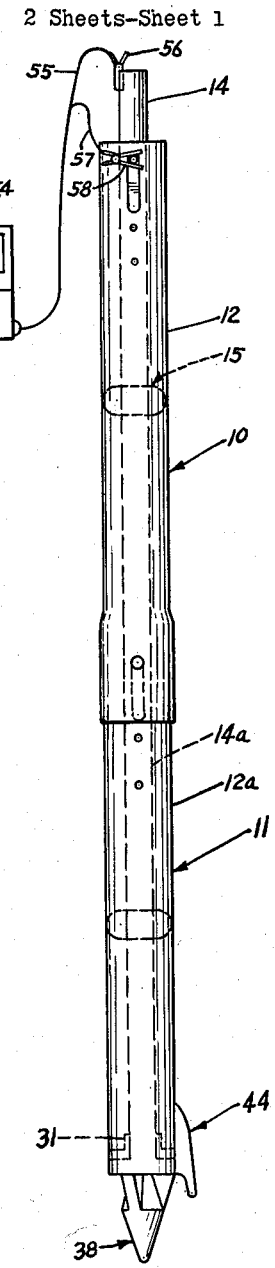

INVENTORS
JAMES F. LAWRENCE
BY HENRY H. KAUFMANN
Moore, White & Burd
ATTORNEYS

United States Patent Office 3,153,344
Patented Oct. 20, 1964

3,153,344
SAMPLING PROBE
James F. Lawrence and Henry H. Kaufmann, St. Louis Park, Minn., assignors to Cargill, Incorporated, Minneapolis, Minn., a corporation of Delaware
Filed July 5, 1962, Ser. No. 207,485
8 Claims. (Cl. 73—421)

This invention is related to the art of taking samples from masses of grain, seeds, meals, flours and other finely divided material by the use of differential air pressure and thus permitting deep penetration of the probe into a mass of the material with a minimum of effort and time. More particularly this invention relates to a novel probe end or nozzle for use with a pneumatic sampling system.

It is one object of this invention to provide a pneumatic sampling probe comprised of a series of rigid double tubes capable of being secured together in end to end relation and separated at will to provide probes of varying lengths and provided with means for passing atmospheric air or other gas through one tube and passing sample particles through the other.

It is another object of this invention to provide such a probe with means adapted for the deep insertion in a mass of grandular material of temperature indicating means.

It is a further object of this invention to provide a probe nozzle fitted with temperature sensitive resistance means by which the probe may be utilized to give instant temperature readings while inserted in a mass of divided material.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is an elevation of the sampling probe according to the present invention shown with the nozzle end connected to one intermediate length of tubing and fitted with means for taking temperature readings;

FIGURE 2 is a side elevation, mostly in section, showing details of construction of the probe nozzle and connecting means between adjacent segments of probe tubing;

FIGURE 3 is a fragmentary elevation showing a portion of the exterior of the sampling probe in the area of connection between adjacent segments of the probe;

Figure 4:
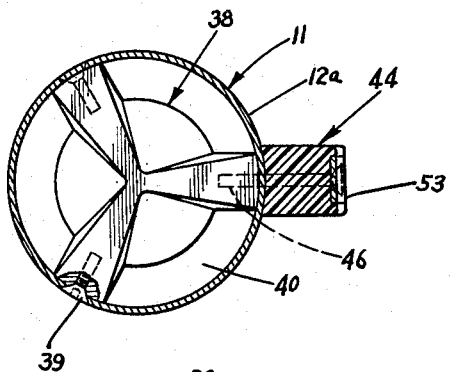
FIGURE 4 is a transverse section on the line 4—4 of FIGURE 2, and in the direction of the arrows, showing the probe tip in greater detail.
Figure 5:
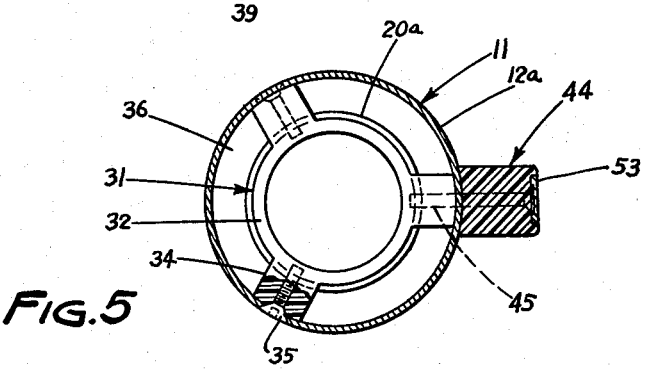
FIGURE 5 is a transverse section on the line 5—5 of FIGURE 2, and in the direction of the arrows, showing in greater detail the support for the bottom end of the inner tube of the probe.
Figure 6:
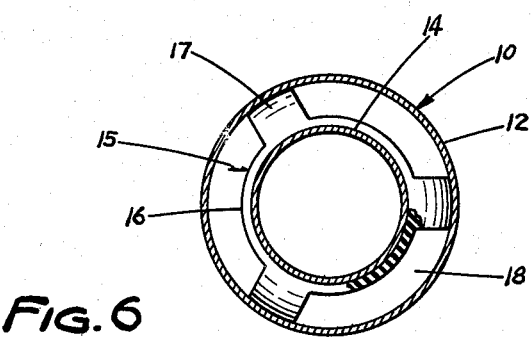
FIGURE 6 is a transverse section on the lines 6—6 of FIGURE 2 and in the direction of the arrows, showing spacer or bumper means between the inner and outer tubes of the probe.

Referring now to the drawings, the probe according to the present invention is comprised of a plurality of like tubular segments, indicated generally at 10, adapted to be connected one to another in end to end relation to produce an elongated tubular element of sufficient length to penetrate the depth of the mass of particulate material from which samples are desired to be taken. A terminal point or nozzle member, indicated generally at 11, is provided at the lowermost end of the tubular probe structure which is intended to penetrate the mass of divided material.

Each of probe segments 10 is comprised of an outer tube 12 and an inner tube 14. Inner tube 14 is held spaced from outer tube 12 by means of one or more spacer elements, indicated generally at 15, each of which is comprised of a collar or sleeve 16 adapted to engage the outer periphery of inner tube 14 and a plurality of approximately equally spaced bumper members 17 extending radially outwardly and adapted to engage the inner surface of outer tube 12.

The spacer members 15 are desirably composed of electrically insulating material and are desirably resilient. For this purpose, spacers of rubber or synthetic rubber-like materials are satisfactory. The spacer members should be tight fitting enough to hold the inner and outer tubes together in a rigid structure but, at the same time, should be slidable longitudinally in order to permit relative movement between the inner and outer tube in assembling and disassembling the components of the tubular segments 10.

An annular space 18 is defined between the inner and outer tubes. This space at the uppermost segment 10 of the probe is left open and in communication with the atmosphere so that atmospheric air may be drawn down through the annular space 18. As is well understood in this art, the free uppermost end of inner tube 14 in the topmost probe segment 10 is adapted to receive a fitting for connecting the inner tube with a source of reduced pressure or vacuum by means of which suction may be applied through the space within inner tube 14 to withdraw samples of divided material from the mass being examined.

The probe point or nozzle segment 11 is similarly comprised of an outer tube 12a and an inner tube 14a adapted to be joined in end-to-end relation with the corresponding inner and outer tubes of tubular probe segments 10. The lowermost end of outer tube 12 is flared slightly at 19 to an inner diameter adapted to fit with a telescopic slide fit over the outer diameter of the outer wall at the end of probe nozzle 11 or another tubular probe segment 10. Similarly, the lowermost end of inner tube 14 is flared slightly at 20 to an inner diameter adapted to fit with a telescopic slide fit around the outer diameter of the inner tube of the probe nozzle 11 or another tubular probe segment 10.

A shoulder 21 is formed at the juncture between outer tube 12 and its flared portion 19. The outer tube bottoms when shoulder 21 comes to rest against the top edge of outer tube 12a of probe nozzle 11, or outer tube 12 of another tubular probe segment 10. Similarly, a shoulder 22 is formed at the juncture between inner tube 14 and its flared portion 20. The inner tube bottoms at the same time when shoulder 22 comes to rest against the top end of inner tube 14a of probe nozzle 11, or the inner tube 14 of another tubular probe segment 10.

The tube segments are locked together by means of releasable latching devices, indicated generally at 24, and evenly spaced around the periphery of the upper ends of tubular probe segment 10 and probe nozzle 11. Each of the latching devices comprises a leaf spring 25 firmly secured, as at 26, to the inner surface of outer tubes 14 and 14a. Attachment may be by means of rivets or the like. A radially outwardly projecting button or lug 27 having a lipped or flanged outer edge 28 is secured to the free end of leaf spring 25.

The bottom flared portions 19 of outer tubes 12 of tubular probe segments 10 are each provided with corresponding apertures 29 through which button or lug 27 extends to hold the tubular segments together. The button has a length equal to at least two wall thicknesses and flanged edge 28 serves to lock the latching means against accidental displacement by engagement of the edge of aperture 29. However, the tubular segments may be readily separated by depressing each button or lug 27 out of engagement with aperture 29.

The button or lug 27 at the free end of leaf spring 25 extends through the wall of the outer tube of the tubular segments through an aperture 30. This aperture is formed in the shape of an elongated slot extending down to the point where the leaf spring is in firm contact with the inner wall surface. Slot 30 functions to prevent any accumulation of dust or grit or other material between the leaf spring and interior surface of the outer tube wall, such as would tend to hold the free end of the leaf spring away from the wall and hold the button or lug 27 out of engagement with the next adjacent tubular segment. With the present construction any foreign material is discharged through the elongated slot opening 30 insuring integrity of the connection between adjacent probe segments.

The inner and outer tubes of the probe end segment or nozzle 11 are held spaced by a spacer means 15 as already described. The lower end of inner tube 14a is supported by a supporting bracket, indicated generally at 31, secured to the outer tube 12a adjacent its lower end. Supporting bracket 31 includes a tubular fitting 32 to which are attached a plurality of radially extending and approximately equally spaced apart projecting lugs or feet 34 by which the supporting bracket is adapted to be rigidly secured within the outer tube 12a, as for example, by means of screws 35. The lower end of inner tube 14a is flared slightly at 20a and swedged onto the upwardly projecting tubular portion of the supporting bracket.

A plurality of arcuate slots 36 are formed between adjacent lugs 34, between the inner surface of the outer tube 12a and the supporting bracket 31. The atmospheric air or other gas which is introduced into the top of the tubular probe in the annular space 18 between the inner and outer walls is thus free to be drawn through the arcuate slots 36 and into a chamber 37 adjacent the bottom end of the tip or nozzle end of the probe. The inner tube 14a and its supporting bracket function as a manifold for the distribution of the air or other gas from the outer annular channel into the chamber where it entrains the material being examined for passage upwardly and outwardly through the inner tube to the suction source and collector. This manifold structure is desirably adapted to be attached to the outer tube at spaced intervals from the end of the outer tube so as to vary the depth of the mixing chamber 37 for most efficient operation in particulate material of various particle sizes. The supporting bracket 31 is desirably composed of strong rigid synthetic resinous material which is electrically insulating.

In order to facilitate insertion of the probe into a mass of particulate material, a conical point or tip, indicated generally at 38, is attached to the bottom end of the outer tube 12a of the probe nozzle segment 11. The conical point 39 is attached to the open end of the outer tube 12a by means of screws 39 or other suitable fastening means. The conical tip 38 is provided with a plurality of channels 40 of approximately equal size and equally spaced about the periphery of the base of the cone and communicating with the mixing chamber 37. When the probe is forced into a mass of particulate material, a certain amount of this material is forced up into the channels and into the chamber where it is entrained in the air or other gas entering through the manifold from the annular channel between the inner and outer tubes and into the zone of reduced pressure within the inner tube from which the sampled material is drawn to the surface.

In order to increase the usefulness of the sampling probe according to the present invention, there is desirably attached to the probe nozzle adjacent the point thereof a temperature tip indicated generally at 44. The temperature tip is secured to the outer surface of outer tube 12a by suitable fastening means such as screws 45 and 46 which also function to secure one of the lugs 34 of the inner tube supporting bracket and the conical tip 38, respectively. The lowermost end of the temperature tip 44 is provided with a hook-like projection 47. This hook-like member is used for the purpose of implanting thermocouple cables in a mass of particulate material so that periodic or continuous temperature readings may be made, as is well known in the art. Temperature tip 44 is desirably formed from a strong rigid electrically insulative synthetic resinous substance.

In order to permit spot temperature readings to be made when the probe is in place in a mass of particulate material, a thermistor is implanted in the temperature tip 44. The thermistor includes as its active element a plate or disc 48 of semiconductor material having a large temperature coefficient of resistance. The thermistor element 48 is urged by pressure of a coil spring 49 into contact with conductive plate 50. The thermistor element is in electrical contact with the outer tube 12a of the probe nozzle element through plate 50 and screws 45 and/or 46 and, through the connections between adjacent segments, with the outer walls 12 of those segments in series. The thermistor element has an electrical lead 51 which is attached, as by means of rivet 52 or the like, to the inner tube 14a of the probe nozzle segment and, through the connections between adjacent segments, with the inner walls 14 of the probe segments in series. The greater area of plate 50 insures better transference of heat to the thermistor element. It is desirably set into the surface of the temperature tip, and also functions as a screw plate.

It will be understood that when the probe is utilized for furnishing spot temperature readings the tubular elements and screws 45 and/or 46 must be constructed of some electrically conductive substance, such as a metal. Where the tubes are formed from anodized aluminum, for example, the anodized layer is removed in selected areas to insure electrical contact between adjacent probe segments. At the same time, it will be understood that the conductive inner and outer tube elements must be electrically insulated from one another and, for this purpose, the spacer elements 15 and the supporting bracket 31 are composed of electrically insulating material.

Temperature may be read by measuring the variations in resistance of the thermistor element. This is done by means of an ohmmeter 54 containing a battery or other low power source and connected by means of one electrical lead 55 and a clip 56 to the inner tube 14 of the probe and by means of another lead 57 and clip 58 to the outer tube of the probe, as for example, through one of the buttons 27. Thus, an electrical circuit may be completed through the thermistor element. The resistance of the thermistor element decreases with increase in temperature, and vice versa. The meter 54 is desirably calibrated to read directly in degrees, or the meter readings may be converted to corresponding temperature readings.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A probe element useful in a pneumatic sampling system and comprising a plurality of rigid elongated segments each comprising an outer tube and an inner tube held spaced therefrom, means for releasably connecting adjacent segments together in substantially air tight communication with each other, one of said segments being an end segment and comprising a nozzle, said nozzle segment including a manifold around the tip end of the inner tube within the nozzle segment for distribution of gas introduced between said outer tube and said inner tube, an end point on said nozzle segment adapted to penetrate a mass of particulate material, a chamber within said nozzle segment between said manifold and end point and a plurality of said channels extending through said end point and in communication with said chamber.

2. A probe element useful in a pneumatic sampling system and comprising a plurality of rigid elongated segments each comprising an outer tube and an inner tube composed of electrically conductive material and held spaced from and electrically insulated from one another, means for releasably connecting adjacent segments together in substantially air tight and electrically conductive communication with each other, one of said segments being an end segment and comprising a nozzle, said nozzle segment including a manifold around the tip end of the inner tube within the nozzle segment for distribution of gas introduced between said outer tube and said inner tube, said manifold including a projecting annular collar to which the inner tube of said nozzle segment is rigidly secured and a plurality of evenly spaced apart radially extending non-conductive lugs which in turn are rigidly secured to the outer tube of said nozzle segment, an end point on said nozzle segment adapted to penetrate a mass of particulate material, a chamber within said nozzle segment between said manifold and end point and a plurality of channels through said end point and in communication with said chamber, a thermistor in said nozzle segment adjacent the end point, the temperature sensitive resistance element of said thermistor being insulated from said tubes but electrically connected to each of said inner tube and outer tube by separate electrical leads.

3. A probe element according to claim 2 further characterized in that said nozzle segment is provided with a rigidly secured downwardly depending hook-like member adjacent said end tip, whereby thermocouple cables can be implanted in a mass of particulate material simultaneously with the sampling thereof.

4. A probe element according to claim 2 further characterized in that said releasably connecting means for said probe segments includes telescoping joints, between said inner tubes and outer tubes, a plurality of outwardly extending, leaf spring mounted, projecting buttons spaced evenly about the inside periphery of the outer tube at one end of each of said probe segments, said buttons having a length at least equal to the combined wall thicknesses of two telescoping outer tubes, said leaf spring mounting being rigidly secured to the inside wall of said outer tube, an elongated slot in said outer tube wall overlying said leaf spring mounting and extending from the outermost edge of said button to approximately the point of attachment of said leaf spring mounting to said outer tube wall, and a plurality of corresponding evenly spaced button receiving apertures adjacent the opposite end of each of said probe segments.

5. A probe element useful in a pneumatic sampling system and comprising a plurality of rigid elongated segments each comprising an outer tube and an inner tube held spaced therefrom, means for releasably connecting adjacent segments together in substantially air tight communication with each other, one of said segments being an end segment and comprising a nozzle, said nozzle segment including a manifold around the tip end of the inner tube within the nozzle segment for distribution of gas introduced between said outer tube and said inner tube, said manifold including a projecting annular collar to which the inner tube of said nozzle segment is rigidly secured and a plurality of evenly spaced apart radially extending lugs which in turn are rigidly secured to the outer tube of said nozzle segment, an end point on said nozzle segment adapted to penetrate a mass of particulate material, a chamber within said nozzle segment between said manifold and end point and a plurality of channels extending through said end point and in communication with said chamber.

6. A probe element useful in a pneumatic sampling system and comprising a plurality of rigid elongated segments each comprising an outer tube and an inner tube held spaced therefrom, means for releasably connecting adjacent segments together in substantially air tight communication with each other, one of said segments being an end segment and comprising a nozzle, said nozzle segment including a manifold around the tip end of the inner tube within the nozzle segment for distribution of gas introduced between said outer tube and said inner tube, an end point on said nozzle segment adapted to penetrate a mass of particulate material, a chamber within said nozzle segment between said manifold and end point and a plurality of channels extending through said end point and in communication with said chamber, said nozzle segment being provided with a rigidly secured downwardly depending hook-like member adjacent said end point, whereby thermocouple cables can be implanted in a mass of particulate material simultaneously with the sampling thereof.

7. A probe element useful in a pneumatic sampling system and comprising a plurality of rigid elongated segments each comprising an outer tube and an inner tube held spaced therefrom; means for releasably connecting adjacent segments together in substantially air tight communication with each other, said releasably connecting means for said probe segments including telescoping joints between said inner tubes and outer tubes, a plurality of outwardly extending, leaf spring mounted, projecting buttons spaced evenly about the inside periphery of the outer tube at one end of each of said probe segments, said buttons having a length at least equal to the combined wall thicknesses of two telescoping outer tubes, said leaf spring mounting being rigidly secured to the inside wall of said outer tube, an elongated slot in said outer tube wall overlying said leaf spring mounting and extending from the outermost edge of said button to approximately the point of attachment of said leaf spring mounting to said outer tube wall, and a plurality of corresponding evenly spaced button receiving apertures adjacent the opposite end of each of said probe segments; one of said probe segments being an end segment and comprising a nozzle, said nozzle segment including a manifold around the tip end of the inner tube within the nozzle segment for distribution of gas introduced between said outer tube and said inner tube; an end point on said nozzle segment adapted to penetrate a mass of particulate material; a chamber within said nozzle segment between said manifold and end point and a plurality of channels extending through said end point and in communication with said chamber.

8. A probe element useful in a pneumatic sampling system and comprising a plurality of rigid elongated segments each comprising an outer tube and an inner tube held spaced therefrom, means for releasably connecting adjacent segments together in substantially air tight communication with each other, one of said segments being an end segment and comprising a nozzle, said nozzle segment including a manifold around the tip end of the inner tube within the nozzle segment for distribution of gas introduced between said outer tube and said inner tube, an end point on said nozzle segment adapted to penetrate a mass of particulate material, a chamber within said nozzle segment between said manifold and end point and a plurality of channels extending through said end point and in communication with said chamber, said inner tubes and outer tubes of said probe segments being composed of electrically conductive materials and said tubes being held out of electrical contact by means of electrically insulating spacer members, said spacer members being disposed between said tubes at spaced intervals permitting the free passage of gas through the space between said tubes, a thermistor in said nozzle segment adjacent the end point thereof, the temperature sensitive resistance element of said thermistor being insulated from said tubes but electrically connected to each of said inner and outer tubes by separate electrical leads.

References Cited in the file of this patent
UNITED STATES PATENTS

| | | |
|---|---|---|
| 1,530,654 | Daley | Mar. 24, 1925 |
| 2,121,858 | Chew | June 28, 1938 |
| 2,771,776 | Haven | Nov. 27, 1956 |
| 2,831,732 | Rieser | Apr. 22, 1958 |
| 2,933,923 | Milochik | Apr. 26, 1960 |
| 3,091,968 | Platzer | June 4, 1963 |

UNITED STATES PATENT OFFICE
CERTIFICATE OF CORRECTION

Patent No. 3,153,344                      October 20, 1964

James F. Lawrence et al.

It is hereby certified that error appears in the above numbered patent requiring correction and that the said Letters Patent should read as corrected below.

Column 5, line 8, strike out "said", first occurrence.

Signed and sealed this 9th day of March 1965.

(SEAL)
Attest:

ERNEST W. SWIDER                      EDWARD J. BRENNER
Attesting Officer                      Commissioner of Patents